US008346000B2

(12) United States Patent
Flierl et al.

(10) Patent No.: US 8,346,000 B2
(45) Date of Patent: Jan. 1, 2013

(54) SYSTEMS, METHODS, DEVICES AND ARRANGEMENTS FOR MOTION-COMPENSATED IMAGE PROCESSING AND CODING

(75) Inventors: Markus H. Flierl, Auerbach (DE); Bernd Girod, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1176 days.

(21) Appl. No.: 12/183,991

(22) Filed: Jul. 31, 2008

(65) Prior Publication Data

US 2009/0034858 A1    Feb. 5, 2009

Related U.S. Application Data

(60) Provisional application No. 60/963,006, filed on Aug. 1, 2007.

(51) Int. Cl.
*G06K 9/46* (2006.01)
*G06K 9/36* (2006.01)

(52) U.S. Cl. ........................................ 382/248; 382/236
(58) Field of Classification Search ................... 382/248
See application file for complete search history.

(56) References Cited

U.S. PATENT DOCUMENTS

| 6,381,276 | B1 | 4/2002 | Pesquet-Popescu et al. | |
| 2004/0066972 | A1* | 4/2004 | Sato et al. | 382/236 |
| 2006/0193524 | A1* | 8/2006 | Tarumoto et al. | 382/232 |

OTHER PUBLICATIONS

Lin Luo; Jin Li; Shipeng Li; Zhenquan Zhuang; Ya-Qin Zhang; , "Motion compensated lifting wavelet and its application in video coding," Multimedia and Expo, 2001. ICME 2001. IEEE International Conference on , vol., no., pp. 365-368, Aug. 22-25, 2001.*
M. Flierl and B. Girod, "Video coding with motion-compensated lifted wavelet transforms," Signal Process.: Image Commun., vol. 19, No. 7, pp. 561-575, Aug. 2004.*
E. Adelson and E. Simoncelli. "Orthogonal pyramid transform for image coding," Proc. SPIE, Visud Cornmun. Imuge Proc., 1987.*
Pesquet-Popescu et al. "Three-Dimensional Lifting Schemes for Motion Compensated Video Compression." Proceedings of the IEEE Int'l Conf. on Acoustics, Speech and Signal Proc. 3, 1793-1796 (May 2001).
Markus Flierl and Bernd Girod. "A Motion Compensated Orthogonal Transform with Energy-Concentration Constraint." IEEE MMSP, Victoria, Canada (Oct. 2006) p. 1-4. Filed as part of Provisional Application.

(Continued)

*Primary Examiner* — Bhavesh Mehta
*Assistant Examiner* — Nirav G Patel
(74) *Attorney, Agent, or Firm* — Crawford Maunu PLLC

(57) ABSTRACT

A variety of methods, devices, systems and arrangements are implemented for processing and coding of video images. According to one such implementation, a method is implemented for encoding a sequence of images. A plurality of orthogonal transforms is implemented on a set of N images, where N is greater than one. The images are linked by motion fields that include sets of respective portions of the images. In particular, the construction of a motion-compensated orthogonal transform is accomplished for the important case where at least one portion of any of the N images—or any part of this portion—is used more than once to motion-compensate other portions of the N images—or parts thereof.

13 Claims, 8 Drawing Sheets

OTHER PUBLICATIONS

Markus Flierl and Bernd Girod. "A Double Motion-Compensated Orthogonal Transform with Energy Concentration Constraints." SPIE Conference on Visual Communications and Image Processing, San Jose, CA (Jan. 2007), p. 1-10. Filed as part of Provisional Application.

Markus Flierl and Bernd Girod. "Half-Pel Accurate Motion-Compensated Orthogonal Video Transforms." IEEE DCC, (Mar. 2007), p. 1-10. Filed as part of Provisional Application.

Markus Flierl and Bernd Girod. "A New Bidirectional Motion-Compensated Orthogonal Transform for Video Coding." IEEE ICASSP, Honolulu, HI (Apr. 2007), p. 1-4. Filed as part of Provisional Application.

Markus Flierl. "Motion-Compensated Orthogonal Transforms for Multiview Video Coding." EURASIP EUSIPCO, Poznan, Poland (Sep. 2007), p. 1-5. Filed as part of Provisional Application.

Markus Flierl and Bernd Girod. "Multiview Video Compression." IEEE Signal Processing (Nov. 2007), p. 66-76. Filed as part of Provisional Application.

* cited by examiner

SYSTEMS, METHODS, DEVICES AND ARRANGEMENTS FOR MOTION-COMPENSATED IMAGE PROCESSING AND CODING

RELATED PATENT DOCUMENTS

This application claims priority, under 35 U.S.C. §119(e), of U.S. Patent Application Ser. No. 60/963,006, entitled "Motion-Compensated Orthogonal Video Transform," and filed on Aug. 1, 2007, which is fully incorporated herein by reference.

FIELD OF THE INVENTION

The present invention relates generally to processing and coding of image sequences, and more particularly to encoding and decoding images using motion compensation.

BACKGROUND

Imaging display technology has been subject to huge growth and technological advances. The ability of displays to provided higher and higher resolution images has resulted in a related increase in the size of the image data necessary to represent the displayed images. Moreover, electronic video displays are being implemented in increasingly smaller sizes. Personal phones and other devices provide users with high-quality view screens. Many of such devices provide access to various networks, such as the Internet, which allow for downloading of video content. Examples of important factors in such applications include processing power (in terms of larger processor size, increased power consumption and/or longer processing times) and bandwidth for video downloads. To compensate for bandwidth limitations, many applications related to the transmission of video content implement relatively complex video compression/coding techniques. Unfortunately, increasing the compression/coding complexity can lead to increases in the processing power necessary to code (i.e., encode or decode).

Many coding techniques use spatial and/or temporal compression techniques (downsampling) involving a transform that helps to decrease the amount of data used to represent the video image. One such transform is the 8×8 discrete cosine transform (DCT). Another type of transform is a wavelet transform. The output of the transform can be quantized to facilitate transmission and further encoding of the data. For example, entropy encoding can be used to further reduce the data size.

Certain types of video coding techniques use temporal redundancies in the video images to reduce the size of the encoded video. For example, various MPEG (and related) standards use predicted-frames (P-frames) or inter-frames to exploit similarities between images. For many applications much (or even all) of the image may remain the same for successive images. Some standards use previously transmitted image data to reproduce other images, thereby allowing a particular frame to be coded with only the differences between the current frame and a previous frame. More complex algorithms allow for compensation for motion of objects within successive frames. In particular, the difference between temporal frames can be determined using motion vectors to track similarities between frames where the similarities may have shifted within the video image. Such motion vectors indicate a possible correlation between pixels or portions of two different images. Generally, the motion vectors are the result of movement of objects within successive images; however, motion vectors can represent similarities between different images other than those resulting from movement of objects. The motion vector represents the difference, if any, in the positions of the pixels/portions of the different images. Such motion vector data will be embedded in the P-frame for use by the decoder. A specific type of motion compensation uses bidirectional-frames (B-frames). Such frames allow for the motion vectors from both the previous and future frames.

Hybrid video coding techniques as well as motion-compensated subband coding schemes can be used to generate data representing image sequences and used for coding and communication applications. To achieve high compression efficiency, some hybrid video encoders operate in a closed-loop fashion such that the total distortion across the reconstructed pictures equals the total distortion in the corresponding intra picture and encoded displaced frame differences. In case of transmission errors, decoded reference frames differ from the optimized reference frames at the encoder and error propagation is observed. On the other hand, transform coding schemes operate in an open-loop fashion. Such open-loop schemes include high-rate transform coding schemes in which the analysis transform produces independent transform coefficients. With uniform quantization, these schemes are optimal when utilizing an orthogonal transform. Further, energy conservation holds for orthogonal transforms such that the total quantization distortion in the coefficient domain equals that in the image domain. In case of transmission errors, the error energy in the image domain equals that in the coefficient domain. Hence, the error energy is preserved in the image domain and is not amplified by the decoder, as is the case, e.g., for predictive decoders.

During the last decade, there have been attempts to incorporate motion compensation into temporal subband coding schemes by approaching problems arising from multi-connected pixels. For example, some methods choose a reversible lifting implementation for the temporal filter and incorporate motion compensation into the lifting steps. In particular, the motion-compensated lifted Haar wavelet maintains orthogonality only for single-connecting motion fields; however, for complex motion fields with many multi-connected and unconnected pixels, the reversible motion-compensated lifted Haar wavelet loses the property of orthogonality. A motion-compensated orthogonal transform that strictly maintains orthogonality for any motion field would be advantageous.

SUMMARY

Aspects of the present invention are directed to image processing and coding applications that address challenges including those discussed above, and that are applicable to a variety of video processing and coding applications, devices, systems and methods. These and other aspects of the present invention are exemplified in a number of implementations and applications, some of which are shown in the figures and characterized in the claims section that follows.

According to one embodiment of the present invention, a method is implemented for representing a sequence of images with the help of a motion-compensated orthogonal basis. A plurality of orthogonal transforms are implemented on a set of N images, where N is greater than one. The images are linked by motion fields that include sets of respective portions of the images. Orthogonality is maintained also for the important case where at least one portion of any of the N images —or any part of this portion—is used more than once to motion-compensate other portions of the N images—or parts thereof.

According to one embodiment of the present invention, a method is implemented for coding a sequence of images. A method includes the step of implementing a plurality of orthogonal transforms on a set of N images, where N is greater than one, the images linked by a motion field that includes sets of respective portions of the images, the motion field defining a first pixel from a portion of the set of N images that is not used to motion-compensate any other portions of the N images and using a second pixel from the set of N images to motion-compensate other portions of the N images at least once.

One embodiment of the present invention relates to a device for coding a sequence of images. The device includes a processing arrangement for implementing a plurality of orthogonal transforms on a set of N images, where N is greater than one. The images are linked by one or more motion fields that include sets of respective portions of the images. The motion field having a first portion of the set of N images that is unconnected by a motion vector to any other portions of the N images and having a second portion of the set of N images connected by a motion vector to other portions of the N images at least once.

An embodiment of the present invention relates to a method for coding a sequence of images. The method includes transforming at least two images of the sequence of images using a plurality of sequential transforms. The sequential transforms modifying respective portions of each of the at least two images. Each transform is orthogonal and also corresponds to a respective motion vector linking the portions.

Another embodiment of the present invention is directed to a method for coding a temporal sequence of images with multiple fields of view for respective temporal timings. For each field of view of a particular temporal timing, two or more images are transformed using a sequence of transforms that modify respective portions of each of the two or more images. Each transform of the sequence of transforms is orthogonal and also corresponds to a respective motion vector linking the portions.

The above summary is not intended to describe each illustrated embodiment or every implementation of the present invention.

BRIEF DESCRIPTION OF THE DRAWINGS

The invention may be more completely understood in consideration of the following detailed description of various embodiments of the invention in connection with the accompanying drawings, in which.

Figure 1A:
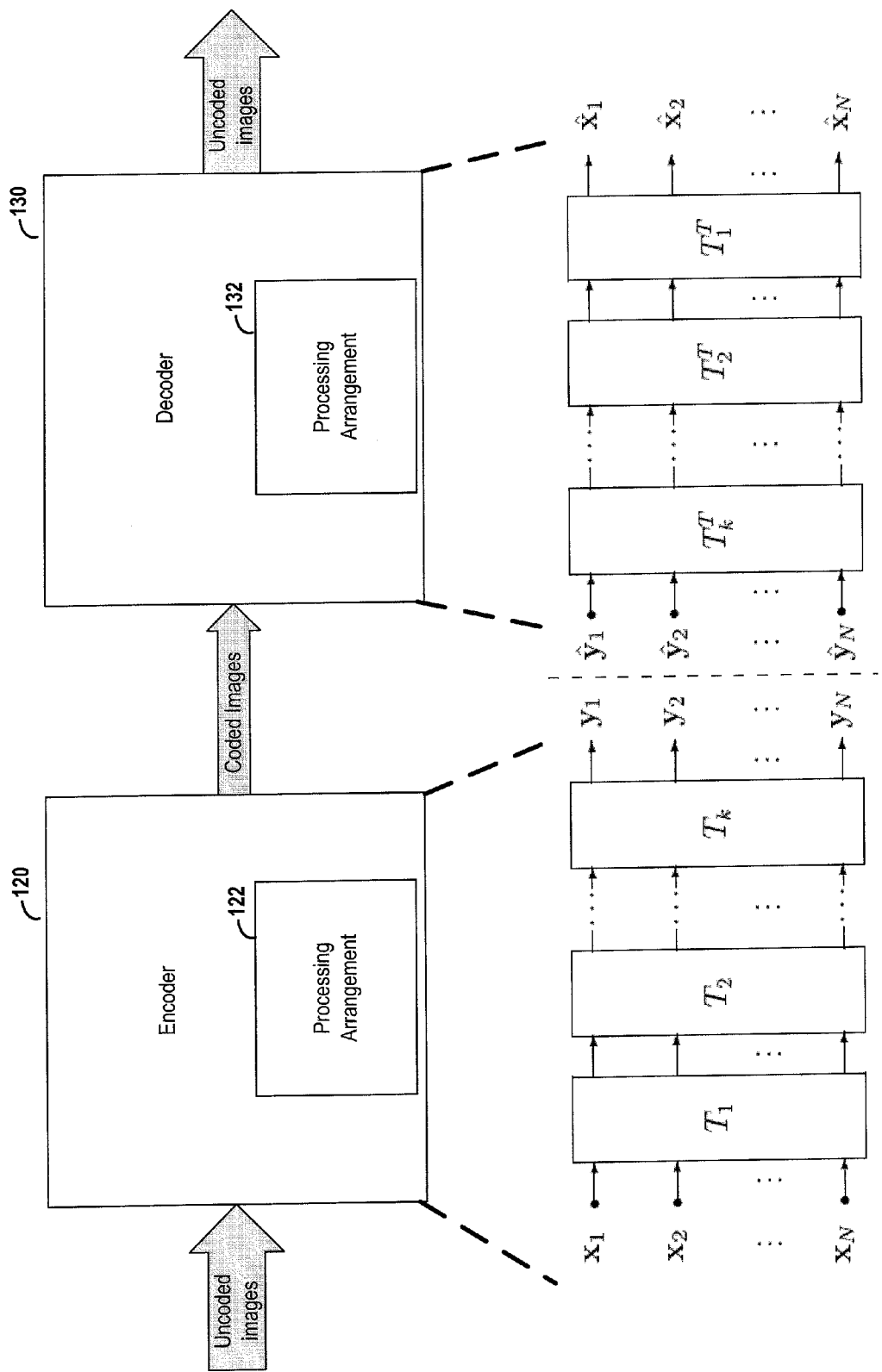
FIG. 1A depicts a system having an encoder and decoder that process and code image data, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is directed to image coding and related approaches, their uses and systems for the same. These and other aspects of the present invention are exemplified in a number of illustrated implementations and applications, some of which are shown and characterized in the following description and related figures, and further in the claims section that follows.

Aspects of the present invention relate to a coding technique that is particularly suited for use with a variety of (complex) motion fields. The transform of an image is implemented as a series of transforms such that the overall transform can be orthogonal for any of a variety of different motion fields. In a specific instance, the overall transform is implemented by factoring into a sequence of incremental transforms. The incremental transforms can be applied to N images, where N is greater than one, to reduce the energy in any of the N images by relying upon correspondence to one or more other images as defined by a motion field. The transform is applied to each portion of the image. By factoring the transform into a series of sequential transforms, the sequential transforms can be selected so that the overall transform is orthogonal. In a particular implementation, each sequential transform can be selected so as to be orthogonal, thereby ensuring that the overall transform is also orthogonal. As the sequential transforms are relatively simple, the process of ensuring the orthogonality of these transforms is practical.

The orthogonal nature of the transforms can be particularly useful for a number of reasons, some of which are described herein. Notwithstanding, other aspects of the invention have utility. For example, factoring the transform into a series of sequential transforms can be used in combination with other aspects, such as multiple motion hypotheses, optimal type selection for each incremental transform, energy conservation, and energy concentration constraints. As another example (not necessarily preferred), certain ones of the incremental transforms need not to be strictly orthogonal. Accordingly, the invention is not limited to only those aspects directly resulting from orthogonal transforms.

According to an example embodiment of the present invention, a video coding scheme is implemented that allows for the use of incremental orthogonal transforms that each maintain their orthogonality for motion fields with zero, one or multiple motion compensations/correspondences. Particular implementations are especially useful for adaptation of the incremental transforms for use with a variety of different possible motion models for a particular pixel or portion of an image.

According to a specific implementation, the incremental transforms can be selected to concentrate energy into the temporal low-band while removing energy from the temporal high-band. In one instance, scale factors are selected to help accomplish such energy concentration. The transforms decompose the image into a low-band image and one or more high-band images. The low-band image contains coarse portions of the signal. The high-band image contains finer details of the signal.

In one implementation, each incremental transform can be evaluated for two or more (hypothetical) motion models. An appropriate motion model can then be selected for each incremental transform.

Various implementations allow for implementation of a decoder for generating image data using incremental (inverse) transforms. In a specific instance, the decoder is able to determine the inverse-motion compensated transform without requiring additional data to indicate the motion-compensation transform selected during an encoding process (e.g., data in addition to the motion information used at the encoder). This can be particularly useful to allow flexibility for the encoder/decoder pair regarding the selection of optimal motion-compensation transforms without requiring transmission of additional data.

A variety of different algorithms, devices, methods and systems can be implemented in accordance with the present invention. The various methods and algorithms can be implemented using a variety of different processing arrangements including, but not limited to, one or more general purpose processors configured with specialized software, special purpose processors, hardware designed to implement one or more functions, programmable logic arrays, digital signal processors and combinations thereof.

The specific algorithms and/or methods implemented include a number of variations from the specific embodiments disclosed herein. For example, variations upon the implementation specifically described herein can be implemented so as to provide a sequence of orthogonal transforms that can be used in connection with complex motion fields. To the extent that specific transforms, motion-compensation models, and/or scale factors are disclosed herein, such disclosures do not preclude variations thereof. For instance, specific examples are discussed in connection with implementations relating to concentration of energy in a low-band image, with respect to one or more high-band images. It should be apparent that there are a multitude of techniques that will improve energy concentration within the framework of the orthogonal transform methodology discussed herein.

Consistent with one implementation of the present invention, the sequential orthogonal transforms can be formed from a number of transforms that are themselves not orthogonal. For example, one implementation involves concatenation of complementary incremental transforms, each potentially non-orthogonal, to form transforms that are orthogonal. This concatenation of two or more transforms to form orthogonal transforms still results in a set of orthogonal transforms.

FIG. 1A depicts a system having an encoder and decoder and for processing and coding image data, according to an example embodiment of the present invention. Encoder 120 receives (uncoded) image data. Optionally, varying levels of coding and other processing can be performed on the image data before and/or after it is received by encoder 120. Consistent with various embodiments of the present invention, processing arrangement 122 is used to implement encoding operations on the image data. For example, a sequence of incremental transforms $T_1$-$T_K$ are performed on image data $x_1$-$X_N$ to produced coded image data $Y_1$-$Y_N$. The coded image data can be stored in memory and/or transmitted to a remote location.

Encoder 130 receives coded image data. Processing arrangement 132 is used to implement decoding operations on the received coded image data. In particular, the decoding operations reverse the coding operations performed by encoder 120. For example, a sequence of incremental transforms $T_K^T$-$T_1^T$ are performed on coded image data $Y_1$-$Y_N$ to produced image data $X_1$-$X_N$.

The processing arrangement can be implemented using a number of different processing circuits including, but not limited to, a general purpose processor configured with specialized software, a special purpose processor, a digital signal processor, a programmable logic device, discrete hardware/logic components and combinations thereof.

Encoder 120 and decoder 130 can be used in a wide range of image applications. One area of use involves video transmissions (e.g., over a network) between two devices. The transmitting device can use an encoded version of the image data to reduce the bandwidth necessary for transmitting an image of a given quality. The receiving device can decode the image data for use (e.g., display) of the image data. A few non-limiting examples of video transmission include Internet broadcasts, downloadable videos, mobile television, satellite television, cable television, streaming video, podcasts, digital video recorders (DVRs) and similar applications. Another area of use involves video capture and subsequent storage or transmission of the captured video. A few non-limiting examples include video cameras encoding images for storage, live web casts, (live or recorded) television events or security applications. Various other implementations are possible, and the above list is merely representative of a few such implementations.

Figure 1B:
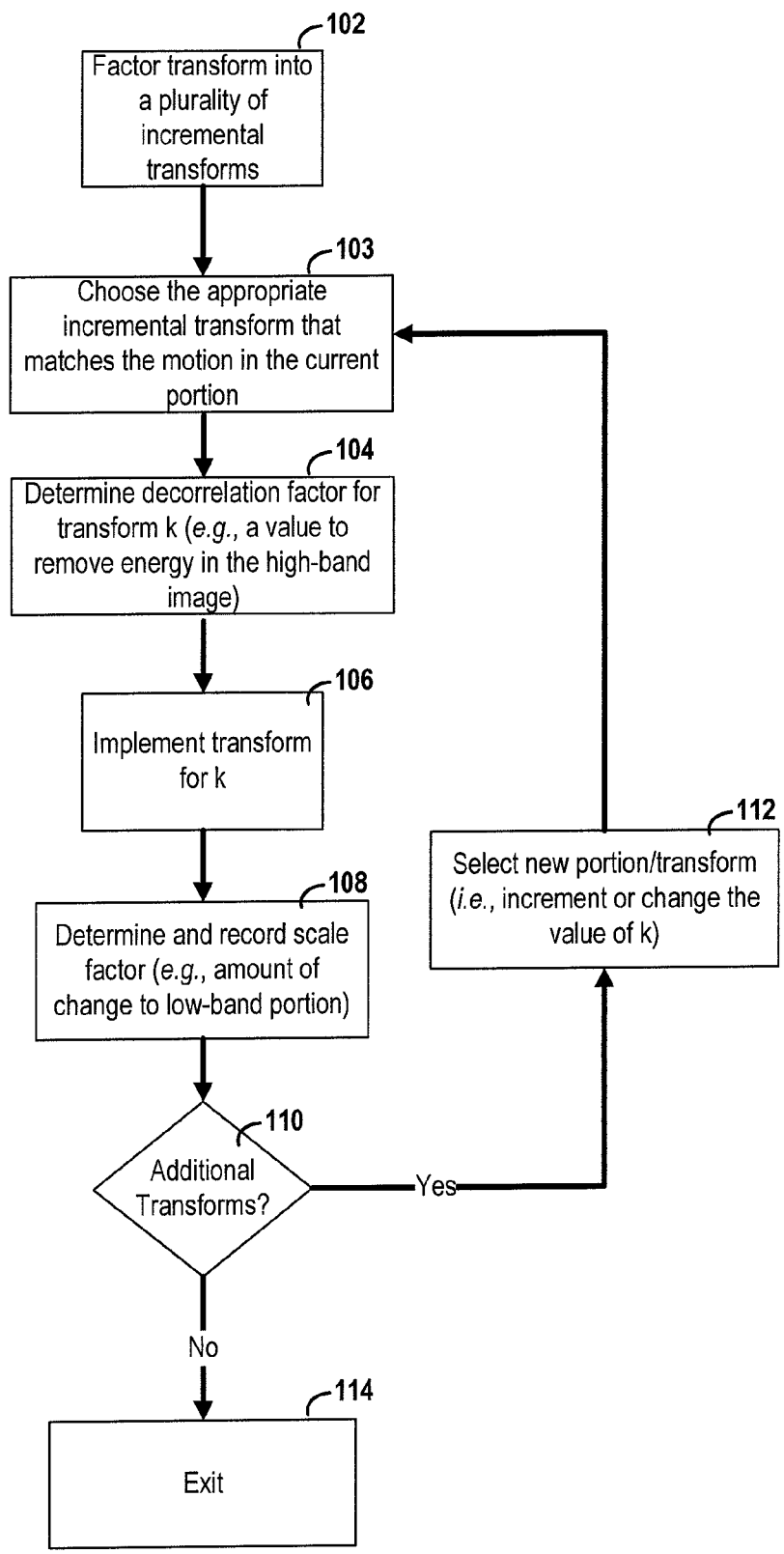
FIG. 1B depicts a flow diagram for coding of images that is consistent with various embodiments of the present invention.

FIG. 1B depicts a flow diagram for coding of images by an encoder or a decoder that is consistent with various embodiments discussed herein. The following steps can be implemented by an encoder or decoder as shown in FIG. 1A. At step 102 the transform of the images is factored into a set of incremental transforms. As discussed herein, each incremental transform can be selected to remove energy from a respective portion of one of the images (e.g., a portion of a high-band image). The transforms can be operated to combine the respective portion with portions of other images linked (by a motion vector) to the respective portion.

At step 103 an appropriate incremental transform is selected. The transform can be selected as a function of the motion of the current portion being operated upon.

A decorrelation factor is determined at step 104. This factor can be determined such that the combination of portions by the incremental transform serves to remove energy from the respective portion. In one instance, the transform can be set so as to remove all energy from the respective portion; however, the invention need not be so limited. The transform is implemented at step 106.

At step 108 a scale factor is determined and/or recorded for one or more of the portions of the images. As discussed herein, the scale factor is particularly useful when the portion is potentially modified by more than one incremental transform. Thus, the particular type of coding and linking between portions can result in the use of scale factors for more, less or even none of the portions. In a specific implementation, the scale factors are implemented for low-band portions that the energy is concentrated into as these portions may receive energy from other high-band portions in subsequent transforms.

At step 110 if additional transforms are left, the process proceeds to step 112 to select the next transform, otherwise the process can exit at step 114. The selection of the next transform 112 can be a simple increment to the next portion/pixel of the image or can be implemented using a more complex algorithm, after which the process returns to step 103. Such an algorithm can take into consideration that the energy concentration can be different depending upon the order that the transforms are implemented. Thus, various factors can be taken into account, including but not limited to, the number of motion vectors linked to a particular portion or the energy in a particular portion.

The following discussions provide a number of different specific example implementations. From these examples, it should be apparent that variations of the invention can be made including, but not limited to, a wide variety of image processing and coding applications other than those specifically mentioned.

According to a specific implementation of the present invention, a coding scheme is implemented for a sequence of video images. Within the coding scheme, $x_1$ and $x_2$ are two vectors representing consecutive pictures of an image sequence. The transform T maps these vectors according to $$\begin{pmatrix} y_1 \\ y_2 \end{pmatrix} = T \begin{pmatrix} x_1 \\ x_2 \end{pmatrix} \quad (1)$$

into two vectors $y_1$ and $y_2$ which represent the temporal low- and high-band, respectively. The transform T is factored into a sequence of k incremental transforms $T_\kappa$ such that $$T = T_K T_{K-1} \ldots T_\kappa \ldots T_2 T_1, \quad (2)$$

where each incremental transform $T_\kappa$ is orthogonal by itself, i.e., $T_\kappa T_\kappa^T = I$ holds for all $\kappa = 1; 2; \ldots, K$, where I denotes the identity matrix. This guarantees that the transform T is also orthogonal. Let $x_1^{(\kappa)}$ and $x_2^{(\kappa)}$ be two vectors representing consecutive pictures of an image sequence if $\kappa = 1$, or two output vectors of the incremental transform $T_{\kappa-1}$ if $\kappa > 1$. The incremental transform $T_\kappa$ maps these vectors according to $$\begin{pmatrix} x_1^{(\kappa+1)} \\ x_2^{(\kappa+1)} \end{pmatrix} = T_k \begin{pmatrix} x_1^{(\kappa)} \\ x_2^{(\kappa)} \end{pmatrix} \quad (3)$$

into two vectors $x_1^{(\kappa+1)}$ and $x_2^{(\kappa+1)}$ which will be further transformed into the temporal low- and high-band, respectively.

To picture the sequence of transformed image pairs $(x_1^{(\kappa)}, x_2^{(\kappa)})$, it can be imagined that the pixels of the image $x_2$ are processed from top-left to bottom-right in κsteps where each step κ is represented by the incremental transform $T_\kappa$.

A specific implementation can be used for 1-hypothesis motion compensation. In a 1-hypothesis motion compensation implementation each pixel in the image $x_2$ is linked to only one pixel in the image $x_1$.

Figure 2:
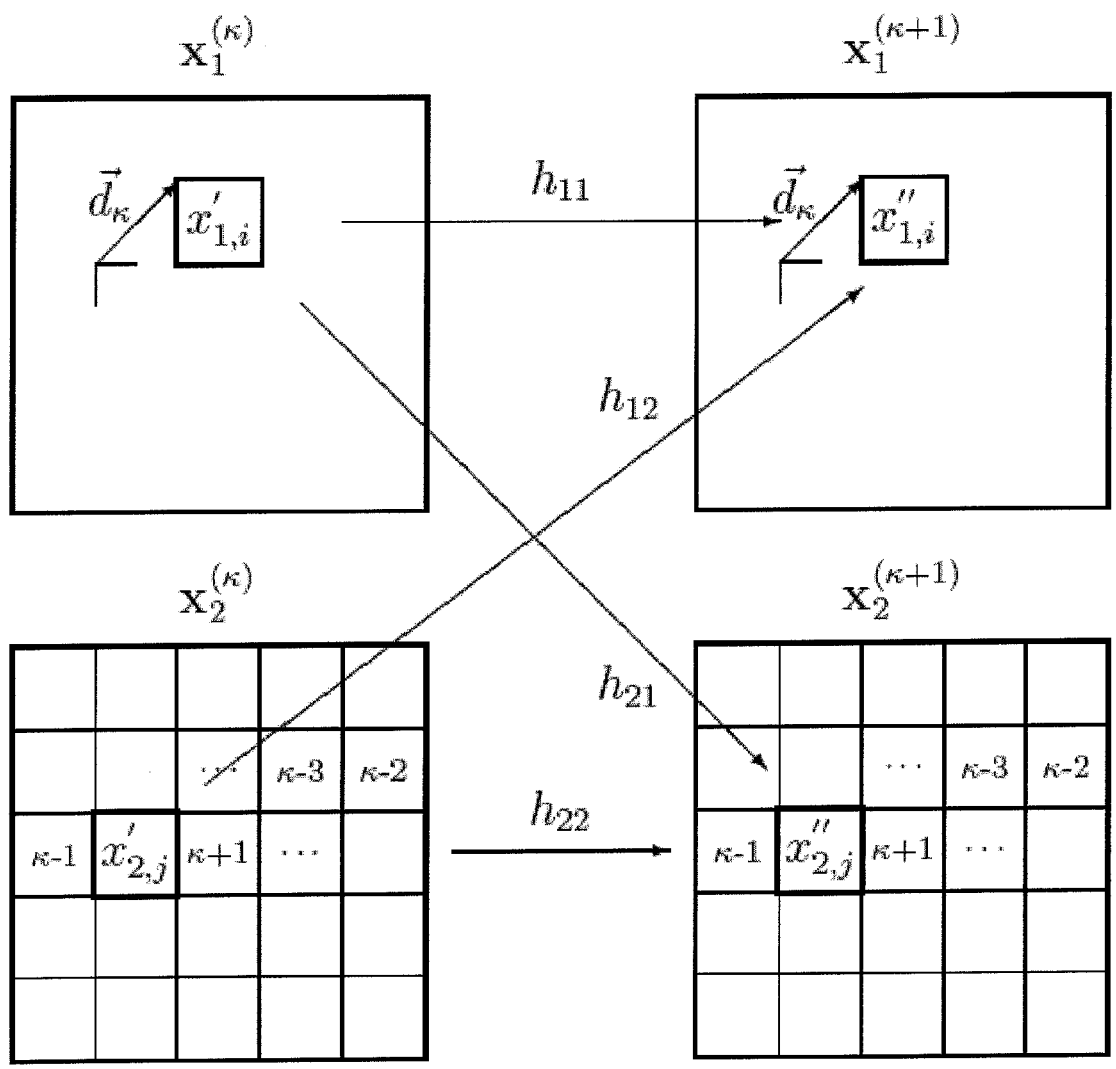
FIG. 2 depicts the process accomplished by the 1-hypothesis incremental transform $T_\kappa$, consistent with an example embodiment of the present invention.

FIG. 2 depicts the process accomplished by the 1-hypothesis incremental transform $T_\kappa$ with its input and output images as defined above. The incremental transform removes the energy of the j-th pixel $x'_{2,j}$ in the image $x_2^{(\kappa)}$ with the help of the i-th pixel $x'_{1,i}$ in the image $x_1^{(\kappa)}$ which is linked by the motion vector $d_\kappa$ (or of the j-th block with the help of the i-th block, if all the pixels of the block have the same motion vector $d_\kappa$). The energy-removed pixel value $x''_{2,j}$ is obtained by a linear combination of the pixel values $x'_{1,i}$ and $x'_{2,j}$ with scalar weights $h_{21}$ and $h_{22}$. The energy-concentrated pixel value $x''_{1,i}$ is also obtained by a linear combination of the pixel values $x'_{1,i}$ and $x'_{2,j}$ but with scalar weights $h_{11}$ and $h_{12}$. All other pixels are left untouched. The scalar weights $h_{\mu\nu}$ are arranged into the matrix $$H = \begin{pmatrix} h_{11} & h_{12} \\ h_{21} & h_{22} \end{pmatrix} \quad (4)$$

to provide orthogonality. For a 2×2 matrix, one scalar decorrelation factor 'a' is sufficient to capture all possible orthogonal transforms. As shown by the form $$H = \frac{1}{\sqrt{1+a^2}} \begin{bmatrix} 1 & a \\ -a & 1 \end{bmatrix}, \quad (5)$$

where a is a positive real value to remove the energy in the image $x_2$ and to concentrate the energy in the image $x_1$. $T_\kappa$ performs only a linear combination with pixel pairs that are connected by the associated motion vector. All other pixels are left untouched. This is reflected with the following matrix notation $$T_\kappa = \begin{bmatrix} \ddots & \vdots & \vdots & \vdots & \vdots & \vdots & \vdots & \vdots & \\ \cdots & 1 & 0 & 0 & \cdots & 0 & 0 & 0 & \cdots \\ \cdots & 0 & h_{11} & 0 & \cdots & 0 & h_{12} & 0 & \cdots \\ \cdots & 0 & 0 & 1 & \cdots & 0 & 0 & 0 & \cdots \\ \vdots & \vdots & \vdots & \vdots & \ddots & \vdots & \vdots & \vdots & \\ \cdots & 0 & 0 & 0 & \cdots & 1 & 0 & 0 & \cdots \\ \cdots & 0 & h_{21} & 0 & \cdots & 0 & h_{22} & 0 & \cdots \\ \cdots & 0 & 0 & 0 & \cdots & 0 & 0 & 1 & \cdots \\ & \vdots & \vdots & \vdots & \vdots & \vdots & \vdots & \vdots & \ddots \end{bmatrix}, \quad (6)$$

where the diagonal elements equal to 1 represent the untouched pixels and where the elements $h_{\mu\nu}$ represent the pixels subject to linear operations.

Figure 3:
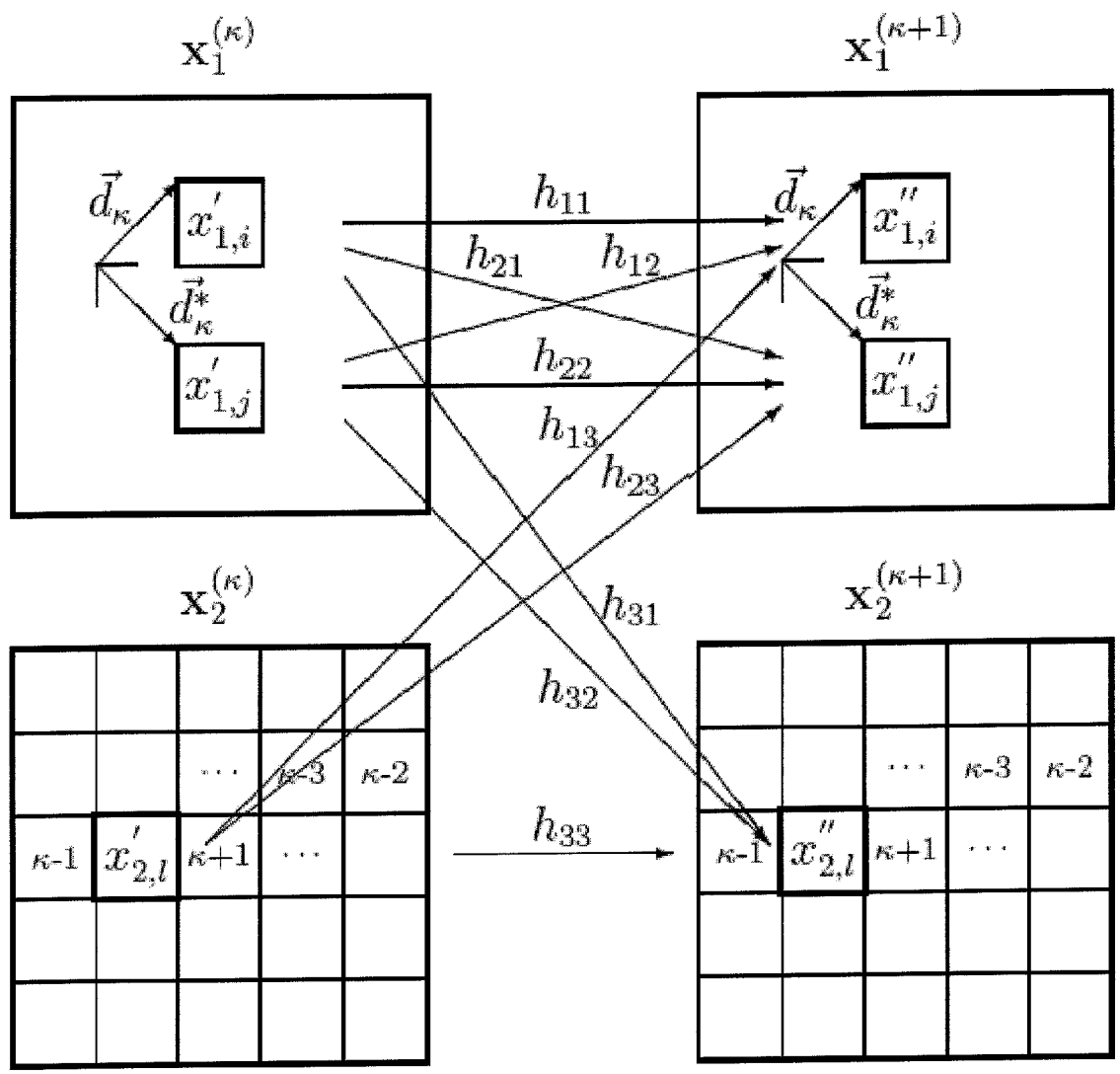
FIG. 3 depicts the process accomplished by the 2-hypothesis incremental transform $T_\kappa$, consistent with an example embodiment of the present invention.

For 2-hypothesis motion compensation, each pixel in the image $x_2$ is linked to two pixels in the image $x_1$. FIG. 3 depicts the process accomplished by the 2-hypothesis incremental transform $T_\kappa$. For this case, nine scalar weights are arranged into the 3×3 orthogonal matrix H. H is constructed with the help of Euler's rotation theorem which states that any rotation can be given as a composition of rotations about three axes, i.e., $H = H_3 H_2 H_1$, where $H_r$ denotes a rotation about one axis. The following composition may be selected for an implementation with the Euler angles ψ, θ, and ø:

$$H = \begin{bmatrix} \cos\psi & \sin\psi & 0 \\ -\sin\psi & \cos\psi & 0 \\ 0 & 0 & 1 \end{bmatrix} \begin{bmatrix} 1 & 0 & 0 \\ 0 & \cos\theta & \sin\theta \\ 0 & \sin\theta & \cos\theta \end{bmatrix} \begin{bmatrix} \cos\phi & \sin\phi & 0 \\ -\sin\phi & \cos\phi & 0 \\ 0 & 0 & 1 \end{bmatrix} \quad (7)$$

For 4-hypothesis motion compensation, each pixel in the image $x_2$ is linked to four pixel in the image $x_1$. Here, 25 scalar weights are arranged into the 5×5 orthogonal matrix H. H is constructed by a composition of rotations about 7 axis. In one implementation the following composition was used:

$$H = H_a(\phi_7) H_b(\phi_6) H_c(\phi_5) H_d(\phi_4) H_e(\phi_3) H_b(\phi_2) H_a(\phi_1) \quad (8)$$

with the following individual rotations:

$$H_a(\phi) = \begin{bmatrix} \cos\phi & \sin\phi & 0 & 0 & 0 \\ -\sin\phi & \cos\phi & 0 & 0 & 0 \\ 0 & 0 & 1 & 0 & 0 \\ 0 & 0 & 0 & 1 & 0 \\ 0 & 0 & 0 & 0 & 1 \end{bmatrix} \quad (9)$$

$$H_b(\phi) = \begin{bmatrix} 1 & 0 & 0 & 0 & 0 \\ 0 & 1 & 0 & 0 & 0 \\ 0 & 0 & \cos\phi & \sin\phi & 0 \\ 0 & 0 & -\sin\phi & \cos\phi & 0 \\ 0 & 0 & 0 & 0 & 1 \end{bmatrix}$$

$$H_c(\phi) = \begin{bmatrix} 1 & 0 & 0 & 0 & 0 \\ 0 & \cos\phi & 0 & \sin\phi & 0 \\ 0 & 0 & 1 & 0 & 0 \\ 0 & -\sin\phi & 0 & \cos\phi & 0 \\ 0 & 0 & 0 & 0 & 1 \end{bmatrix} \quad (10)$$

$$H_d(\phi) = \begin{bmatrix} 1 & 0 & 0 & 0 & 0 \\ 0 & 1 & 0 & 0 & 0 \\ 0 & 0 & 1 & 0 & 0 \\ 0 & 0 & 0 & \cos\phi & \sin\phi \\ 0 & 0 & 0 & -\sin\phi & \cos\phi \end{bmatrix}$$

Further multi-hypothesis motion compensations can be constructed in a similar fashion. In a preferred embodiment, the orthogonal matrix H is constructed by a composition of appropriate Euler rotations.

Another aspect of the present invention is directed to implementation of an energy concentration constraint. The decorrelation factors and angles of the incremental transforms are chosen such that the energy in the temporal low band is concentrated.

Consider the pixel pair $x_{1,i}$ and $x_{2,j}$ to be processed by the incremental transform $T_\kappa$ in FIG. 3. To determine the decorrelation factor a for the pixel $x_{2,j}$, it is assumed that the pixel $x_{2,j}$ is connected to the pixel $x_{1,i}$ such that $x_{2,j} = x_{1,i}$. Consequently, the resulting "high-band to be" pixel $x''_{2,j}$ shall be zero. Note that the pixel $x_{1,i}$ may have been processed previously by $T_\tau$, where $\tau < \kappa$. Therefore, let $v_1$ be the scale factor for the pixel $x_{1,i}$ such that $x'_{1,i} = v_1 x_{1,i}$. At the first wavelet decomposition level, each pixel $x_{2,j}$ of the picture $x_2$ is used only once during the transform process. Therefore, there is no need to maintain a scale counter for the pixels in the picture $x_2$. At the second level of temporal decomposition, both pictures $x_1$ and $x_2$ are temporal low-bands resulting from transforms at the first level. Therefore, a scale factor $v_2$ can be considered for the pixel $x_{2,j}$, i.e., $x'_{2,j} = v_2 x_{2,j}$. Let $u_1$ be the scale factor for the pixel $x_{1,i}$ after it has been processed by $T_\kappa$. The pixels $x'_{1,i}$ and $x'_{2,j}$ are then processed by $T_\kappa$ as follows:

$$\begin{bmatrix} u_1 x_{1,i} \\ 0 \end{bmatrix} = \frac{1}{\sqrt{1+a^2}} \begin{bmatrix} 1 & a \\ -a & 1 \end{bmatrix} \begin{bmatrix} v_1 x_{1,i} \\ v_2 x_{1,i} \end{bmatrix} \quad (11)$$

The conditions of energy conservation and energy concentration are satisfied if $$u_1 = \sqrt{v_1^2 + v_2^2} \text{ and } a = \frac{v_2}{v_1}. \quad (12)$$

Aspects of the present invention are also useful for implementation in connection with multi-hypothesis motion compensation involving two or more potential motion compensation models. In FIG. 3, the three Euler angles for each pixel touched by the incremental transform are to be chosen such that the energy in image $x_2$ is minimized. Consider the pixel triplet $x_{1,i}$, $x_{1,j}$, and $x_{2,l}$ to be processed by the incremental transform $T_\kappa$. To determine the Euler angles for the pixel $x_{2,l}$ it is assumed that the pixel $x_{2,l}$ is connected to the pixels $x_{1,i}$ and $x_{1,j}$ such that $x_{2,l} = x_{1,i} = x_{1,j}$. Consequently, the resulting high-band pixel $x''_{2,l}$ shall be zero. Note that the pixels $x_{1,i}$ and $x_{1,j}$ may have been processed previously by $T_\tau$, where $\tau < \kappa$. Therefore, let $v_1$ and $v_2$ be the scale factors for the pixels $x_{1,i}$ and $x_{1,j}$, respectively, such that $x'_{1,i} = v_1 x_{1,i}$ and $x'_{1,j} = v_2 x_{1,j}$. The pixel $x_{2,l}$ is used only once during the transform process T and no scale factor needs to be considered. In general, when considering subsequent dyadic decompositions with T, scale factors are passed on to higher decomposition levels and, consequently, they need to be considered, i.e., $x'_{2,l} = v_3 x_{2,l}$. For the first decomposition level, $v_3 = 1$. Let $u_1$ and $u_2$ be the scale factors for the pixels $x_{1,i}$ and $x_{1,j}$, respectively, after they have been processed by $T_\kappa$. Now, the pixels $x'_{1,i}$, $x'_{1,j}$, and $x'_{2,l}$ are processed by $T_\kappa$ as follows:

$$\begin{bmatrix} u_1 x_{1,i} \\ u_2 x_{1,i} \\ 0 \end{bmatrix} = H_3 H_2 H_1 \begin{bmatrix} v_1 x_{1,i} \\ v_2 x_{1,i} \\ v_3 x_{1,i} \end{bmatrix} \quad (13)$$

Energy conservation requires that $u_1^2 + u_2^2 = v_1^2 + v_2^2 + v_3^2$. The Euler angle ø in $H_1$ is chosen such that the two hypotheses $x'_{1,i}$ and $x'_{1,j}$ are weighted equally after being attenuated by their scale factors $v_1$ and $v_2$.

$$\tan\phi = -\frac{v_1}{v_2} \quad (14)$$

The Euler angle θ in $H_2$ is chosen such that it meets the zero-energy constraint for the high-band in (13).

$$\tan\theta = \frac{v_3}{\sqrt{v_1^2 + v_2^2}} \quad (15)$$

Finally, the Euler angle ψ in $H_3$ is chosen such that the pixels $x_{1,i}$ and $x_{1,j}$, after the incremental transform $T_\kappa$, have scalar weights $u_1$ and $u_2$, respectively.

$$\tan\psi = \frac{u_1}{u_2} \quad (16)$$

This ratio is open for selection. The angle ø was selected such that the i-th pixel $x_{1,i}$ and the j-th pixel $x_{1,j}$ have equal contribution after rescaling with $v_1$ and $v_2$. Consequently, the scale factors $u_1$ and $u_2$ were selected such that their energy increases equally.

$$u_1 = \sqrt{v_1^2 + \frac{v_3^2}{2}} \text{ and } u_2 = \sqrt{v_2^2 + \frac{v_3^2}{2}} \qquad (17)$$

For 4-hypothesis motion compensation, 7 angles were chosen to minimize the energy of pixels in the image $x_2$. To determine the angles for the pixel $x_{2,l}$, it is assumed that the pixel is connected to the pixels $x_{1,i}$, $x_{1,j}$, $x_{1,\mu}$, and $x_{1,\nu}$ such that $x_{2,l} = x_{1,i} = x_{1,j} = x_{1,\mu} = x_{1,\nu}$. Let $v_1$; $v_2$; $v_3$; and $v_4$ be the scale factors for the four pixels in $x_1$ and let $v_5$ be that of the pixel $x_{2,l}$. Let $u_1$; $u_2$; $u_3$; and $u_4$ be the scale factors for the four pixels in $x_1$ after they have been processed by $T_\kappa$. Now, the four pixels in $x_1$ as well as the pixel $x'_{2,l}$ are processed by $T_\kappa$ as follows:

$$\begin{bmatrix} u_1 x_{2,l} \\ u_2 x_{2,l} \\ u_3 x_{2,l} \\ u_4 x_{2,l} \\ 0 \end{bmatrix} = H_a(\phi_7) H_b(\phi_6) H_c(\phi_5) H_d(\phi_4) H_c(\phi_3) H_b(\phi_2) H_a(\phi_1) \begin{bmatrix} v_1 x_{2,l} \\ v_2 x_{2,l} \\ v_3 x_{2,l} \\ v_4 x_{2,l} \\ v_5 x_{2,l} \end{bmatrix} \qquad (18)$$

Energy conservation requires that $u_1^2 + u_2^2 + u_3^2 + u_4^2 = v_1^2 + v_2^2 + v_3^2 + v_4^2 + v_5^2$. The angle $\phi_1$ is chosen such that the two hypotheses $x'_{1,i}$ and $x'_{1,j}$ are weighted equally after being attenuated by their scale factors $v_1$ and $v_2$. The same argument holds for angle $\phi_2$. The angle $\phi_3$ is chosen such that the combination of the two previous hypothesis pairs is also weighted equally after being attenuated by their combined scale factors. With this, weights are generally achieved as powers of two, and in this particular case, a weight of ¼ is achieved for each hypothesis. The angle $\phi_4$ is chosen such that it meets the zero-energy constraint for the high-band in (18). Finally, the angles $\phi_5$, $\phi_6$, and $\phi_7$ are chosen such that the pixels in $x_1$, after the incremental transform $T_\kappa$, have scalar weights $u_\rho$, $\rho = 1; 2; 3; 4$.

$$\tan\phi_1 = -\frac{v_1}{v_2}, \tan\phi_2 = -\frac{v_3}{v_4}, \tan\phi_3 = -\frac{\sqrt{v_1^2 + v_2^2}}{\sqrt{v_3^2 + v_4^2}} \qquad (19)$$

$$\tan\phi_4 = \frac{v_5}{\sqrt{v_1^2 + v_2^2 + v_3^2 + v_4^2}} \qquad (20)$$

$$\tan\phi_5 = \frac{\sqrt{u_1^2 + u_2^2}}{\sqrt{u_3^2 + u_4^2}}, \tan\phi_6 = \frac{u_3}{u_4}, \tan\phi_7 = \frac{u_1}{u_2} \qquad (21)$$

The ratios among $u_\rho$ are free to be selected. The angles were selected such that each hypothesis has equal contribution. Consequently, the scale factors $u_\rho$ were selected such that their energy increases equally.

$$u_\rho = \sqrt{v_\rho^2 + \frac{v_5^2}{4}} \text{ for } \rho = 1, 2, 3, 4 \qquad (22)$$

Aspects of the present invention are directed to half-pel accurate motion compensation. Using three types of incremental transforms, half-pel accurate motion compensation can be achieved where half-pel intensity values are obtained by averaging neighboring integer-pel positions.

Figure 4:
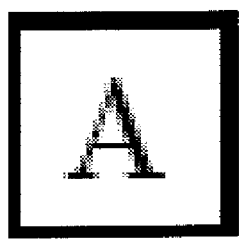
FIG. 4 depicts the neighboring integer-pel positions labeled by A to D, consistent with an example embodiment of the present invention.
Figure 4:
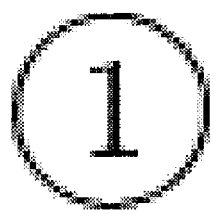
Figure 4:
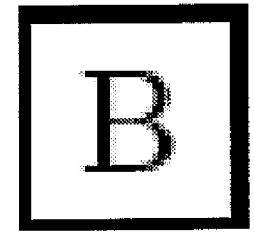
Figure 4:
Figure 4:
Figure 4:
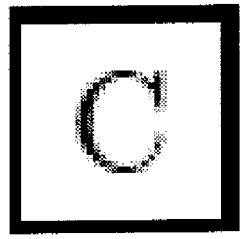
Figure 4:
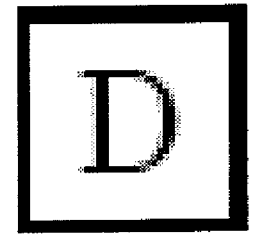

FIG. 4 depicts the neighboring integer-pel positions labeled by A to D. Half-pel positions are labeled by 1 to 3. The half-pel intensity value of 1 is obtained by averaging integer positions A and B. For the value of 2, positions A and C are used. In both cases, the 2-hypothesis incremental transform is used. The value of 3 is obtained by averaging integer values at positions A to D. In this case, the 4-hypothesis incremental transform is utilized. The granularity of the cascade of incremental transforms allows half-pel motion-compensated blocks of arbitrary shape and size.

The following example implementation describes an approach that can be useful for bidirectional motion compensation. The presented bi-directionally motion-compensated orthogonal transform is able to consider up to two motion fields per frame, although more motion fields per frame are possible. The transform is factored into a sequence of incremental transforms which are strictly orthogonal. The incremental transforms maintain scale counters. The decorrelation factors of each incremental transform are determined such that an energy-concentration constraint is met for bidirectional motion compensation.

To factor the transform into incremental transforms, the construction of the incremental transform and the incorporation of the energy-concentration constraint are outlined hereafter. Let $x_1$, $x_2$, and $x_3$ be three vectors representing consecutive pictures of an image sequence. The transform T maps these vectors according to $$\begin{pmatrix} y_1 \\ y_2 \\ y_3 \end{pmatrix} = T \begin{pmatrix} x_1 \\ x_2 \\ x_3 \end{pmatrix} \qquad (23)$$

into three vectors $y_1$, $y_2$, and $y_3$, which represent the first temporal low-band, the high-band, and the second temporal low-band, respectively. The transform T can be factored into a sequence of k incremental transforms $T_\kappa$ such that $$T = T_\kappa T_{\kappa-1} \ldots T_\kappa \ldots T_2 T_1, \qquad (24)$$

where each incremental transform $T_\kappa$ is orthogonal by itself, i.e., $T_\kappa T^T_\kappa = I$ holds for all $\kappa = 1; 2; \ldots; \kappa$. This guarantees that the transform T is also orthogonal.

Let $x_1^{(\kappa)}$, $x_2^{(\kappa)}$ and $x_3^{(\kappa)}$ be three vectors representing consecutive pictures of an image sequence if $\kappa = 1$, or three output vectors of the incremental transform $T_{\kappa-1}$ if $\kappa > 1$. The incremental transform $T_\kappa$ maps these vectors according to $$\begin{pmatrix} x_1^{(\kappa+1)} \\ x_2^{(\kappa+1)} \\ x_3^{(\kappa+1)} \end{pmatrix} = T_\kappa \begin{pmatrix} x_1^{(\kappa)} \\ x_2^{(\kappa)} \\ x_3^{(\kappa)} \end{pmatrix} \qquad (25)$$

into three vectors $x_1^{(\kappa+1)}$, $x_2^{(\kappa+1)}$ and $x_3^{(\kappa+1)}$ which will be further transformed into the first temporal low-band, high-band, and second temporal low-band, respectively.

Figure 5:
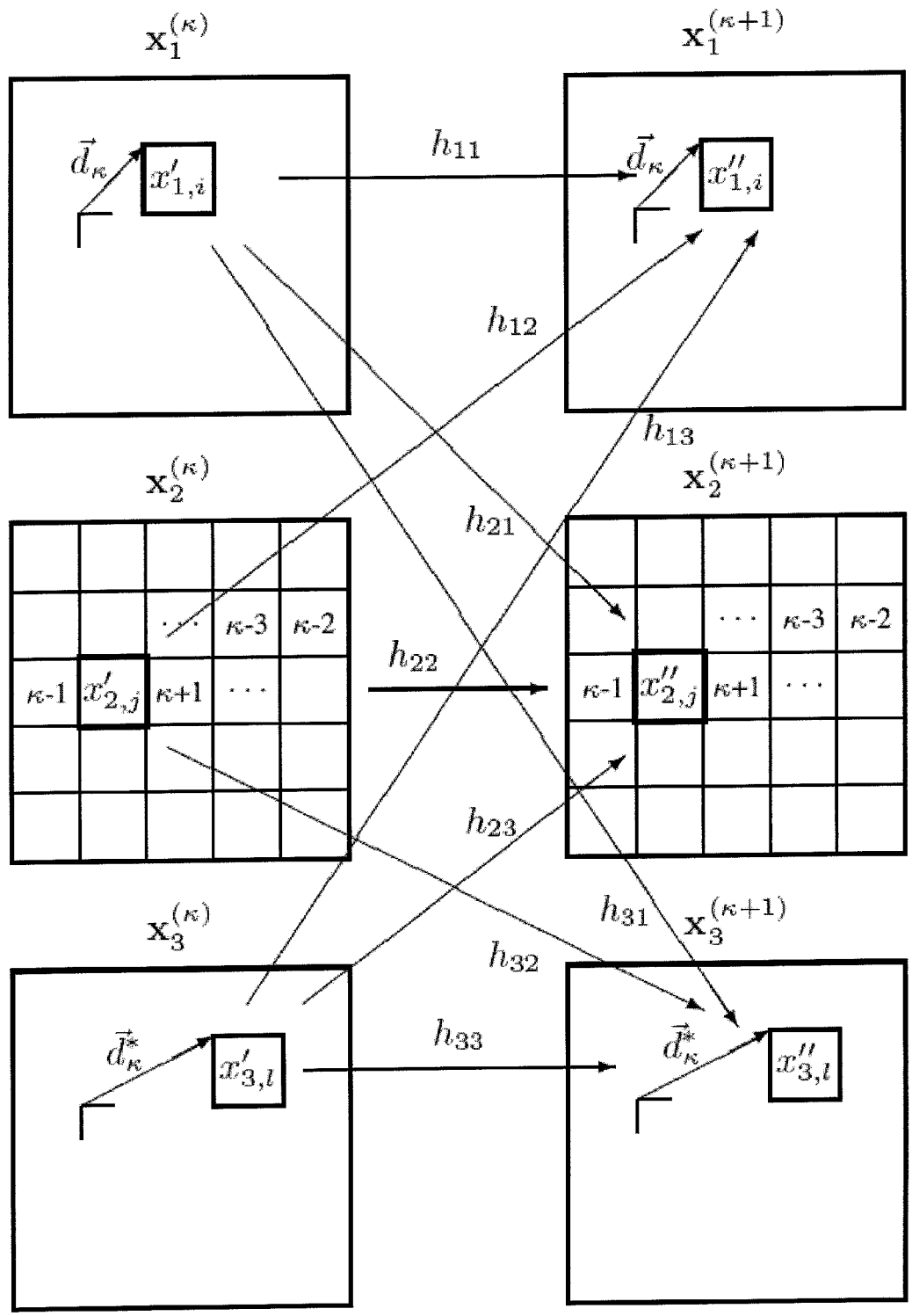
FIG. 5 depicts the process accomplished by the incremental transform $T_\kappa$, consistent with an example embodiment of the present invention when processing more than two images.

FIG. 5 depicts the process accomplished by the incremental transform $T_\kappa$ with its input and output images as defined above. The incremental transform removes the energy of the j-th pixel $x'^{(\kappa)}_{2,j}$ in the image $x_2^{(\kappa)}$ with the help of both the i-th pixel $x'^{(\kappa)}_{1,i}$ in the image $x_1^{(\kappa)}$ which is linked by the motion vector $\vec{d_\kappa}$ and the l-th pixel $x'^{(\kappa)}_{3,l}$ in the image $x_3^{(\kappa)}$ which is linked by the motion vector $\vec{d_\kappa}^*$ (or the j-th block with the help of both the i-th and the l-th block if all the pixels of the i-th and l-th block have the motion vectors $\vec{d}_\kappa$ and $\vec{d}_\kappa{}^*$, respectively). The energy-removed pixel value $x''_{2,j}$ is obtained by a linear combination of the pixel values $x'_{1,i}$, $x'_{2,j}$, and $x'_{3,l}$ with scalar weights $h_{21}$, $h_{22}$, and $h_{23}$. The energy-concentrated pixel value $x''_{1,i}$ is also obtained by a linear combination of the pixel values $x'_{1,i}$, $x'_{2,j}$, and $x'_{3,l}$ but with scalar weights $h_{11}$, $h_{12}$, and $h_{13}$. The energy-concentrated pixel value $x''_{3,l}$ is calculated accordingly. All other pixels are left untouched.

Thus, the incremental transform $T_\kappa$ touches only pixels that are linked by the same motion vector pair ($\vec{d}_\kappa, \vec{d}_\kappa{}^*,$). Of these, $T_\kappa$ performs only a linear combination with three pixels that are connected by this motion vector pair. All other pixels are left untouched. This is reflected in the following matrix notation:

$$T_\kappa = \begin{pmatrix} \ddots & \vdots & \vdots & \vdots & \vdots & \vdots & \vdots & \vdots & \vdots & \vdots \\ \ldots & 1 & 0 & \ldots & 0 & 0 & \ldots & 0 & 0 & \ldots \\ \ldots & 0 & h_{11} & \ldots & 0 & h_{12} & \ldots & 0 & h_{13} & \ldots \\ \vdots & \vdots & \vdots & \ddots & \vdots & \vdots & \vdots & \vdots & \vdots & \vdots \\ \ldots & 0 & 0 & \ldots & 1 & 0 & \ldots & 0 & 0 & \ldots \\ \ldots & 0 & h_{21} & \ldots & 0 & h_{22} & \ldots & 0 & h_{23} & \ldots \\ \vdots & \vdots & \vdots & \vdots & \vdots & \ddots & \vdots & \vdots & \vdots & \vdots \\ \ldots & 0 & 0 & \ldots & 0 & 0 & \ldots & 1 & 0 & \ldots \\ \ldots & 0 & h_{31} & \ldots & 0 & h_{32} & \ldots & 0 & h_{33} & \ldots \\ \vdots & \vdots & \vdots & \vdots & \vdots & \vdots & \vdots & \vdots & \vdots & \ddots \end{pmatrix} \quad (26)$$

The diagonal elements that equal 1 represent the untouched pixels and the elements $h_{\mu\nu}$ represent the pixels subject to linear operations. All other entries are zero. The scalar weights $h_{\mu\nu}$ are then arranged into the 3×3 matrix H. The incremental transform $T_\kappa$ is orthogonal if H is also orthogonal. An orthogonal H is constructed with the help of Euler's rotation theorem which states that any 3-d rotation can be given as a composition of rotations about three axes, i.e., $H=H_3H_2H_1$, where $H_r$ denotes a rotation about one axis. The following composition was chosen $$H = \begin{pmatrix} h_{11} & h_{12} & h_{13} \\ h_{21} & h_{22} & h_{23} \\ h_{31} & h_{32} & h_{33} \end{pmatrix} = \quad (27)$$

$$\begin{pmatrix} \cos(\psi) & 0 & \sin(\psi) \\ 0 & 1 & 0 \\ -\sin(\psi) & 0 & \cos(\psi) \end{pmatrix} \begin{pmatrix} 1 & 0 & 0 \\ 0 & \cos(\theta) & -\sin(\theta) \\ 0 & \sin(\theta) & \cos(\theta) \end{pmatrix} \begin{pmatrix} \cos(\phi) & 0 & \sin(\phi) \\ 0 & 1 & 0 \\ -\sin(\phi) & 0 & \cos(\phi) \end{pmatrix}$$

with the Euler angles $\psi$, $\theta$, and $\phi$. The Euler angles will be determined in relation to the energy concentration constraint as discussed hereafter. Note that, to carry out the full transform T, each pixel in $x_2$ is touched only once whereas the pixels in $x_1$ and $x_3$ may be touched multiple times or never. Further, the order in which the incremental transforms $T_\kappa$ are applied does not affect the orthogonality of T, but it may affect the energy concentration of the transform T.

The three Euler angles for each pixel touched by the incremental transform have to be chosen such that the energy in image $x_2$ is minimized. In an example, the pixel triplet $x_{1,i}$, $x_{2,j}$, and $x_{3,l}$ is to be processed by the incremental transform $T_\kappa$. To determine the Euler angles for the pixel $x_{2,j}$, it is assumed that the pixel $x_{2,j}$ is connected to the pixels $x_{1,i}$ and $x_{3,l}$ such that $x_{2,j}=x_{1,i}=x_{3,l}$. Consequently, the resulting high-band pixel $x''_{2,j}$ shall be zero. Note that the pixels $x_{1,i}$ and $x_{3,l}$ may have been processed previously by $T_\tau$, where $\tau<\kappa$. Therefore, $v_1$ and $v_3$ are implemented as the scale factors for the pixels $x_{1,i}$ and $x_{3,l}$, respectively, such that $x'_{1,i}=v_1x_{1,i}$ and $x'_{3,l}=v_3x_{3,l}$. The pixel $x_{2,j}$ is used only once during the transform process T and no scale factor needs to be considered; however, in general, when considering subsequent dyadic decompositions with T, scale factors are passed on to higher decomposition levels and, consequently, they should to be considered, i.e., $x'_{2,j}=v_2x_{2,j}$. For the first decomposition level, $v_2=1$. Let $u_1$ and $u_3$ be the scale factors for the pixels $x_{1,i}$ and $x_{3,l}$, respectively, after they have been processed by $T_\kappa$. Now, the pixels $x'_{1,i}$, $x'_{2,j}$, and $x'_{3,l}$ are processed by $T_\kappa$ as follows:

$$\begin{pmatrix} u_1 x_{1,i} \\ 0 \\ u_3 x_{1,i} \end{pmatrix} = H_3 H_2 H_1 \begin{pmatrix} v_1 x_{1,i} \\ v_2 x_{1,i} \\ v_3 x_{1,i} \end{pmatrix} \quad (28)$$

Energy conservation requires that $$u_1^2 + u_3^2 = v_1^2 + v_2^2 + v_3^2. \quad (29)$$

The Euler angle $\phi$ in $H_1$ is chosen such that the two hypotheses $x'_{1,i}$ and $x'_{3,l}$ are weighted equally after being attenuated by their scale factors $v_1$ and $V_3$.

$$\tan(\phi) = -\frac{v_1}{v_3} \quad (30)$$

The Euler angle $\theta$ in $H_2$ is chosen such that it meets the zero-energy constraint for the high-band in (28).

$$\tan(\theta) = \frac{v_2}{\sqrt{v_1^2 + v_3^2}} \quad (31)$$

Finally, the Euler angle $\psi$ in $H_3$ is chosen such that the pixels $x'_{1,i}$ and $x'_{3,l}$, after the incremental transform $T_\kappa$, have scalar weights $u_1$ and $u_3$, respectively.

$$\tan(\psi) = u_1/u_3 \quad (32)$$

Note that this ratio can be chosen freely. The Euler angle $\phi$ was chosen such that the previous frame and the future frame have equal contribution after rescaling with $v_1$ and $v_3$. Consequently, the scale factors $u_1$ and $u_3$ were chosen such that they increase equally.

$$u_1 = \sqrt{v_1^2 + \frac{v_2^2}{2}} \text{ and } u_3 = \sqrt{v_3^2 + \frac{v_2^2}{2}} \quad (33)$$

Scale counters can be utilized to keep track of the scale factors. Scale counters count how often a pixel is used as reference for motion compensation. Before any transform is applied, the scale counter for each pixel is $n=0$ and the scale factor is $v=1$. For arbitrary scale counter n and m, the scale factors are $$v=\sqrt{n+1} \text{ and } u=\sqrt{m+1}. \quad (34)$$

After applying the incremental transform, the scale counters are updated for the modified pixels. For the aforementioned 1-hypothesis uni-directionally motion compensated orthogonal transform, the updated scale counter for low-band pixels is given by $m=n_1+n_2+1$, where $n_1$ and $n_2$ are the scale counters of the utilized input pixel pairs. For the bi-directionally motion-compensated orthogonal transform, the updated scale counters for low-band pixels result from (33) as follows:

$$m_1 = n_1 + \frac{n_2+1}{2} \text{ and } m_3 = n_3 + \frac{n_2+1}{2} \quad (35)$$

As an example, consider the transform in the first decomposition level where $n_2=0$. The 1-hypothesis uni-directionally motion-compensated transform increases the scale counter by 1 for each used reference pixel, whereas the bi-directionally motion-compensated transform increases the counter by 0.5 for each of the two used reference pixels.

Further embodiments of the present invention combine multi-hypothesis motion as explained above with bi-directionally motion-compensated orthogonal transforms.

An embodiment of the present invention relates to use of a dyadic transform for groups of pictures. One of the aforementioned orthogonal transforms is defined for three input pictures but generates two temporal low-bands. In combination with other orthogonal transforms discussed herein, an orthogonal transform can be defined with only one temporal low-band for groups of pictures whose number of pictures is larger than two and a power of two.

Figure 6:
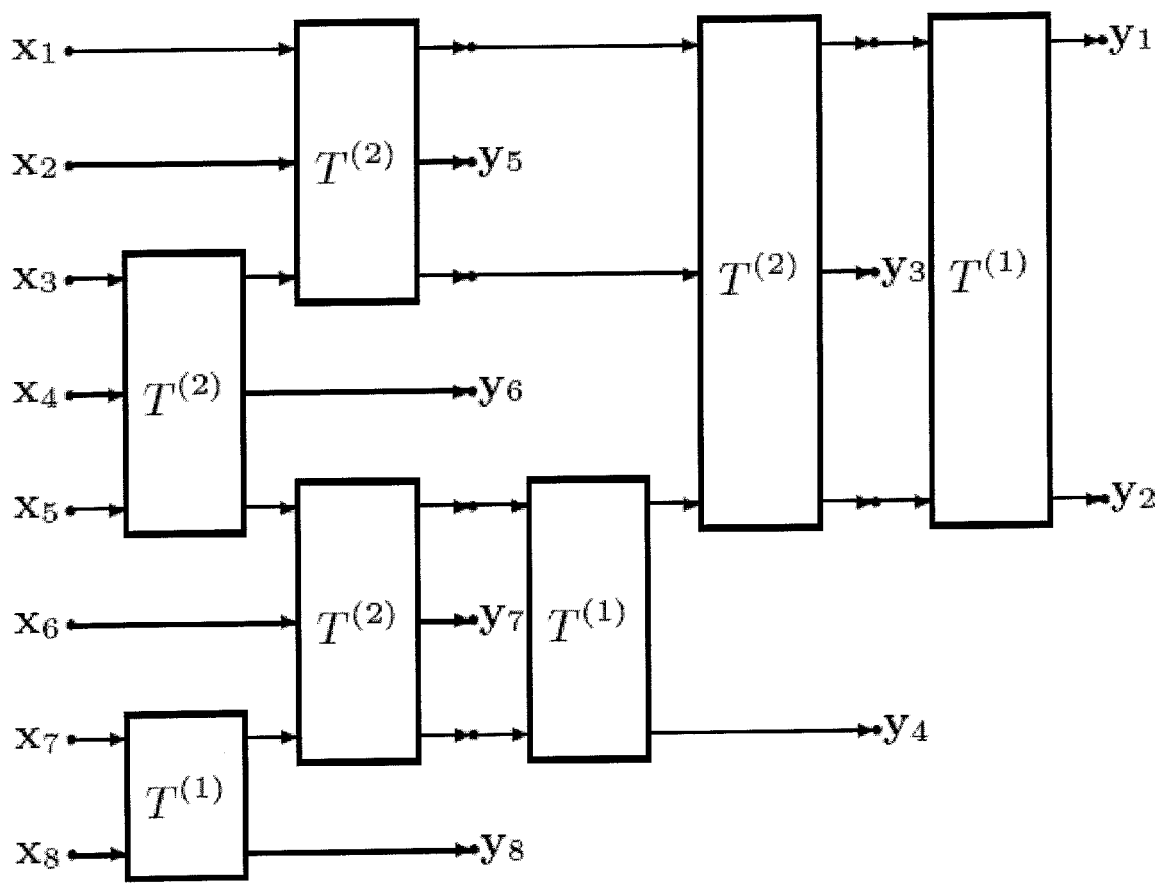
FIG. 6 depicts a decomposition of a group of 8 pictures $x_\rho$ into one temporal low-band $y_1$ and 7 high-bands $y_\rho$, $\rho=2; 3; \ldots ; 8$, consistent with an example embodiment of the present invention.

FIG. 6 depicts a decomposition of a group of eight pictures $x_\rho$ into one temporal low-band $y_1$ and seven high-bands $y_\rho$, $\rho=2; 3; \ldots; 8$. $T^{(1)}$ denotes a uni-directionally motion-compensated orthogonal transform. $T^{(2)}$ denotes a bi-directionally motion-compensated orthogonal transform. Note that this architecture permits also block-wise decisions between unidirectional and bidirectional motion compensation.

Further embodiments of the present invention relate to motion-compensated orthogonal transforms for N images, where N is greater than one and not limited to a power of two. The incremental transforms which process all N images at a time generate N-1 high-bands while concentrating the energy of N images into one low-band.

An embodiment of the present invention relates to motion compensated orthogonal transforms for mono-view and multi-view video coding. A bi-directionally motion-compensated orthogonal transform is used as a starting point as described above. Referring back to FIG. 5 and also to matrix (26), the diagonal elements equal to 1 represent the untouched pixels and the elements $h_{\mu\nu}$ represent the pixels subject to linear operations. All other entries are zero. If bidirectional motion compensation is used in step $\kappa$, incremental transforms $T_\kappa^{(2)}$ with the general form of (26) are used. For uni-directional motion compensation, the incremental transforms simplifies. For example, unidirectional motion compensation from $x_1$ does not require the picture $x_3$. Hence, the pixels in $x_3$ are not altered in step $\kappa$ and the sub-matrix of $T_\kappa$ which modifies the pixels in $x_3$ is simply an identity matrix. An incremental transform that accomplishes unidirectional motion compensation in step $\kappa$ has the following matrix notation:

$$T_\kappa^{(1)} = \begin{pmatrix} \ddots & \vdots & \vdots & \vdots & \vdots & \vdots & \vdots & \vdots & \vdots \\ \cdots & 1 & 0 & \cdots & 0 & 0 & \cdots & 0 & 0 & \cdots \\ \cdots & 0 & h_{11} & \cdots & 0 & h_{12} & \cdots & 0 & 0 & \cdots \\ \vdots & \vdots & \vdots & \ddots & \vdots & \vdots & \vdots & \vdots & \vdots \\ \cdots & 0 & 0 & \cdots & 1 & 0 & \cdots & 0 & 0 & \cdots \\ \cdots & 0 & h_{21} & \cdots & 0 & h_{22} & \cdots & 0 & 0 & \cdots \\ \vdots & \vdots & \vdots & \vdots & \vdots & \ddots & \vdots & \vdots & \vdots \\ \cdots & 0 & 0 & \cdots & 0 & 0 & \cdots & 1 & 0 & \cdots \\ \cdots & 0 & 0 & \cdots & 0 & 0 & \cdots & 0 & 1 & \cdots \\ \vdots & \vdots & \vdots & \vdots & \vdots & \vdots & \vdots & \vdots & \ddots \end{pmatrix} \quad (36)$$

Further, if any type of motion compensation is not suitable for a pixel or block in $x_2$, the corresponding incremental transform in step $\kappa$ is set to $$T_\kappa^{(0)} = I, \quad (37)$$

where I denotes the identity matrix. This called the intra mode for a pixel, block, or portion in the picture $x_2$.

Thus, the type of incremental transform can be chosen freely in each step $\kappa$ to match the motion of the affected pixels in $x_2$ without destroying the property of orthonormality. In each step $\kappa$, the scalar weights $h_{\mu\nu}$ are arranged into the matrix $H_\kappa$. The incremental transform $T_\kappa$ is orthogonal if $H_\kappa$ is also orthogonal. Unidirectional motion compensation is accomplished with a 2×2 matrix $H_\kappa^{(1)}$, and bidirectional motion compensation with a 3×3 matrix $H_\kappa^{(2)}$. In general, p-hypothesis motion requires a $(p+1)\times(p+1)$ matrix $H_\kappa^{(p)}$. The coefficients of $H_\kappa$ in each step $\kappa$ will be determined as taught hereafter in connection with the energy concentration constraint. Note that, to carry out the full transform T, each pixel in $x_2$ is touched only once whereas the pixels in $x_1$ and $x_3$ may be touched multiple times or never. Further, the order in which the incremental transforms $T_\kappa$ are applied does not affect the orthogonality of T, but it may affect the energy concentration of the transform T.

An aspect of the present invention relates to the energy concentration constraint. The coefficients $h\mu\nu$ of $H_\kappa$ have to be chosen such that the energy in image $x_2$ is minimized. The aforementioned method can be used to reduce the energy in the high-band to zero for any motion vector field, if the input pictures are identical and of constant intensity introduced scale factors u and v to capture the effect of previous incremental transforms on the intensity of each pixel. For example, consider unidirectional motion compensation. With the notation in FIG. 5 and above assumption, $x''_{1,i} = u_1 x_{1,i}$ and $x'_{1,i} = v_1 x_{1,i}$. Energy concentration is accomplished if $$\begin{pmatrix} u_1 x_{1,i} \\ 0 \end{pmatrix} = H_\kappa^{(1)} \begin{pmatrix} v_1 x_{1,i} \\ v_2 x_{1,i} \end{pmatrix} \quad (38)$$

is satisfied, i.e., the high-band coefficient is zero. Thus, energy conservation requires that the scale factors satisfy $$u_1^2 = v_1^2 + v_2^2. \quad (39)$$

Further, energy concentration determines also the decorrelation factor that is the sole degree of freedom for the 2×2 matrix $H_\kappa^{(1)}$. Interestingly, this decorrelation factor is determined only by the scale factors $v_1$ and $v_2$. Moreover, the scale factors are linked to so-called scale counters m and n such that $$u = \sqrt{m+1} \text{ and } v = \sqrt{n+1}. \quad (40)$$

The scale counters simply count for each pixel how often it is used as reference for motion compensation. Processing starts with scale counters set to zero for all pixels. For unidirectional motion compensation, the scale counter update rule is simply $$m_1 = n_1 + n_2 + 1. \tag{41}$$

Bidirectional motion compensation uses two reference pixels at the same time. Hence, two scale counters have to be updated. For example, the following scale counter update rule has been used $$m_1 = n_1 + \frac{n_2+1}{2} \text{ and } m_3 = n_3 + \frac{n_2+1}{2} \tag{42}$$

Note that for bidirectional motion compensation, the 3×3 matrix $H_\kappa^{(2)}$ can be factored into rotations about three axes with the help of Euler's rotation theorem. This implies that the bi-directionally motion-compensated incremental transform has only three degrees of freedom. For general p-hypothesis motion, the extension of Euler's theorem to the p+1-dimensional space can be utilized.

Aspects of the present invention relate to dyadic transforms for groups of pictures. The bidirectional transform described above is defined for three input pictures and generates two temporal low-bands. In combination with the unidirectional transform, an orthogonal transform was defined with only one temporal low-band for each group of pictures whose number of pictures is larger than two and a power of two. There is freedom to choose the type of motion compensation and, if necessary, the intra mode for each incremental transform individually. Hence, the dyadic structure for groups of pictures permits an intra block mode as well as block-wise decisions between unidirectional and bidirectional motion compensation. This ability to adapt can be used for mono-view as well as for multi-view video coding schemes.

An example coding scheme cascades the decompositions in time and view direction. First, each view is independently decomposed with motion-compensated orthogonal transforms. Second, the resulting temporal low-bands are further decomposed in view direction with disparity-compensated orthogonal transforms. The multi-view video data is arranged into a Matrix of Pictures (MOP). Each MOP consists of N image sequences, each with κ temporally successive pictures. With that, the correlation is considered among all the pictures within a MOP.

Figure 7:
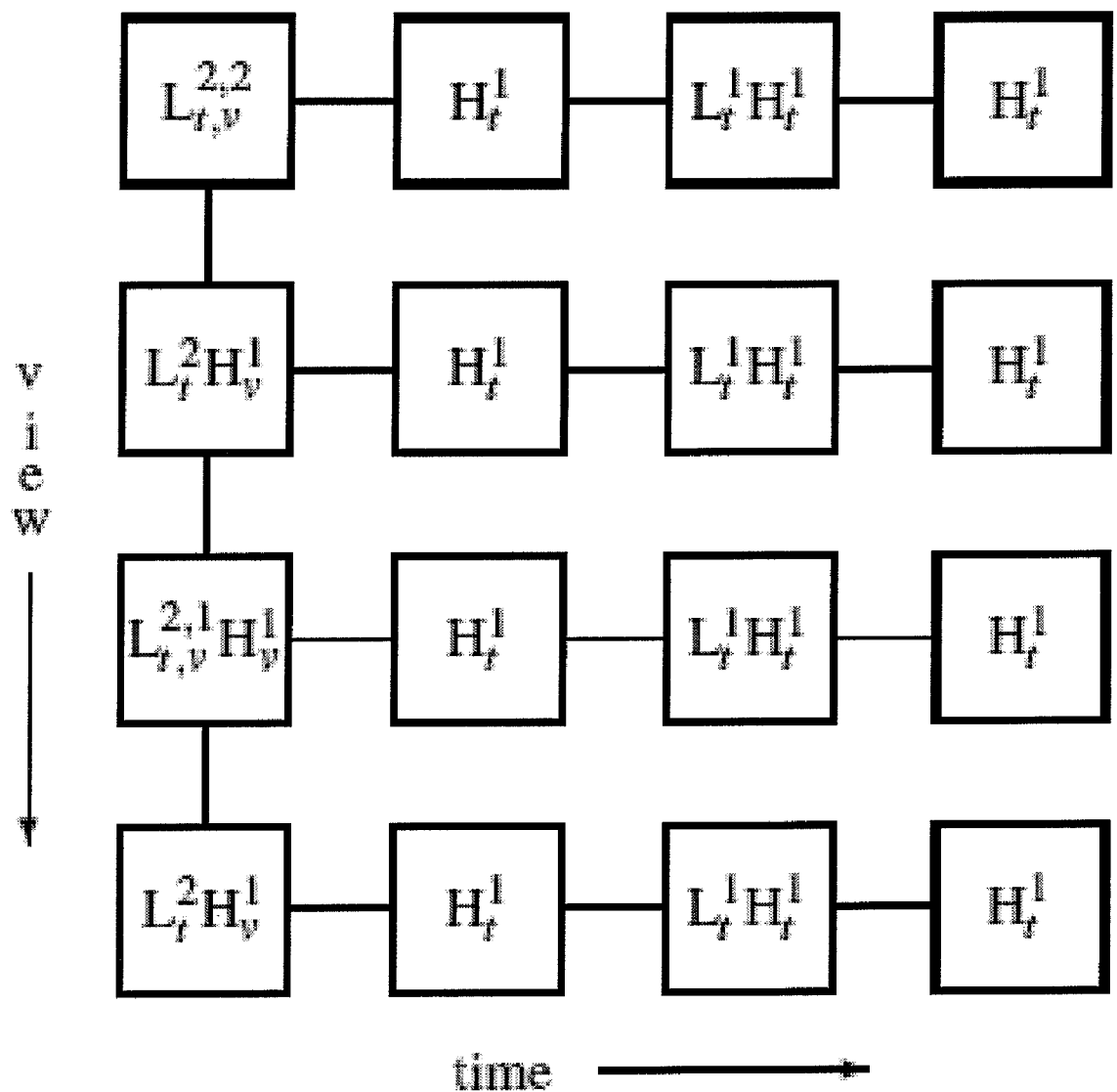
FIG. 7 shows a matrix of pictures (MOP) for N=4 image sequences indicating the resulting subbands after the transform, consistent with an example embodiment of the present invention.

FIG. 7 shows a matrix of pictures (MOP) for N=4 image sequences, each comprising of κ=4 temporally successive pictures. The coding structure is also shown. The temporal decomposition of each view is followed by one view decomposition only.

An implementation of decomposition of the multiview video signal is discussed on connection with the example in FIG. 7. FIG. 7 depicts a MOP of N=4 image sequences, each comprising of κ=4 temporally successive pictures. Each MOP is encoded with one low-band picture and Nκ-1 high-band pictures. First, a 2-level multi-resolution decomposition of each view sequence in temporal direction is accomplished with motion-compensated orthogonal transforms. The first frame of each view is represented by the temporal low-band $L_t^2$, the remaining frames of each view by temporal high-bands $H_t^1$. Second, a 2-level multi-resolution decomposition of the temporal low-bands $L_t^2$ in view direction is accomplished with disparity-compensated orthogonal transforms. After the decomposition of N temporal low-bands, the MOP low-band $L_t^2 L_v^2$ is obtained along with the remaining N-1 view high-bands $H_v^1$. Only the disparity fields among the views at the first time instant in the MOP are to be used. Further decomposition of the temporal high-bands $H_t^1$ in view direction is not intended for this description. It may be that such decomposition with additional disparity fields will provide a superior overall performance.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, the methods, devices and systems discussed herein may be implemented in connection with a variety of technologies such as those involving one or more of portable video displays, downloadable content, video phones and other communication devices, personal computers, DVD players, next generation video players and the like. The invention may also be implemented using a variety of approaches such as those involving images captured from multiple points of view. Such modifications and changes do not depart from the true spirit and scope of the present invention, including that set forth in the following claims.

What is claimed is:

1. A processor implemented method for processing or coding a sequence of images, the method comprising:
    implementing an orthogonal transform on a set of N images, where N is greater than one, the images linked by motion fields that include sets of respective portions of the images, where at least one pixel in a portion of one of the N images is used more than once to motion-compensate other portions of the N images; and
    applying scale factors to portions of the images, the scale factors determined as a function of energy conservation and of a scale counter representing the utility to motion-compensate other portions.

2. A processor implemented method for processing or coding a sequence of images, the method comprising:
    implementing an orthogonal transform on a set of N images, where N is greater than one, the images linked by motion fields that include sets of respective portions of the images, where at least one pixel in a portion of one of the N images is used more than once to motion-compensate other portions of the N images; and
    updating scale factors and scale counters to maintain energy conservation.

3. A processor implemented method for processing or coding a sequence of images, the method comprising:
    implementing an orthogonal transform on a set of N images, where N is greater than one, the images linked by motion fields that include sets of respective portions of the images, where at least one pixel in a portion of one of the N images is used more than once to motion-compensate other portions of the N images, where among a set of possible incremental orthogonal transforms, including a trivial identity matrix, a transform is chosen to meet further constraints for a particular application.

4. A processor implemented method for processing or coding a sequence of images, the method comprising:
    implementing an orthogonal transform on a set of N images, where N is greater than one, the images linked by motion fields that include sets of respective portions of the images, where at least one pixel in a portion of one of the N images is used more than once to motion-compensate other portions of the N images, where the orthogonal transform is implemented to maximize the energy concentration into the low-band.

5. The method of claim 4, where the orthogonal transform is implemented to maximize the energy concentration into the low-band and to limit the increase of certain scale counters by choosing alternative incremental transforms.

6. A processor implemented method for processing or coding a sequence of images, the method comprising:
implementing an orthogonal transform on a set of N images, where N is greater than one, the images linked by motion fields that include sets of respective portions of the images, where at least one pixel in a portion of one of the N images is used more than once to motion-compensate other portions of the N images, and applying scale factors to pixels, the scale factors "v" determined as a function of scale counters "c" by the relation $v=\sqrt{c+1}$, wherein c represents how frequently pixels of the images are linked by motion vectors.

7. A device for processing or coding a sequence of images, the device comprising:
a processing arrangement for implementing an orthogonal transform on a set of N images, where N is greater than one, the images linked by motion fields that include sets of respective portions of the images, where at least one pixel of a portion of one of the N images is used more than once to motion-compensate other portions of the N images, wherein the processing arrangement is further configured and arranged for applying scale factors to portions of the images, the scale factors determined as a function of energy conservation and of scale counters representing the utility to motion-compensate other portions.

8. A device for processing or coding a sequence of images, the device comprising:
a processing arrangement for implementing an orthogonal transform on a set of N images, where N is greater than one, the images linked by motion fields that include sets of respective portions of the images, where at least one pixel of a portion of one of the N images is used more than once to motion-compensate other portions of the N images, where the processing arrangement is further configured and arranged for applying scale factors to pixels, the scale factors "v" determined as a function of scale counters "c" by the relation $v=\sqrt{c+1}$, wherein c represents how frequently pixels of the images are linked by motion vectors.

9. A device for processing or coding a sequence of images, the device comprising:
a processing arrangement for implementing an orthogonal transform on a set of N images, where N is greater than one, the images linked by motion fields that include sets of respective portions of the images, where at least one pixel of a portion of one of the N images is used more than once to motion-compensate other portions of the N images, wherein the orthogonal transforms are implemented and configured to be used to superimpose multiple motion-compensated portions, the portions being linked by more than one motion vector.

10. A device for processing or coding a sequence of images, the device comprising:
a processing arrangement for implementing an orthogonal transform on a set of N images, where N is greater than one, the images linked by motion fields that include sets of respective portions of the images, where at least one pixel of a portion of one of the N images is used more than once to motion-compensate other portions of the N images, where the orthogonal transform is implemented such that the energy concentration into the low-band is maximized.

11. The device of claim 10, where the orthogonal transform is implemented such that the energy concentration into the low-band is maximized and the increase of certain scale counters is limited by choosing alternative incremental transforms.

12. The method of claim 10, wherein each transform modifies only portions that have the same respective motion vector.

13. A processor implemented method for coding a sequence of images, the method comprising:
implementing a plurality of orthogonal transforms on a set of N images, where N is greater than one, the images linked by a motion field that includes sets of respective portions of the images, the motion field defining a first pixel from a portion of the set of N images that is not used to motion-compensate any other portions of the N images and using a second pixel from the set of N images to motion-compensate other portions of the N images at least once.

* * * * *